Dec. 25, 1945.　　　　S. E. LARSON　　　　2,391,577
ROTARY PUMP SHAFT SEAL
Filed March 19, 1943
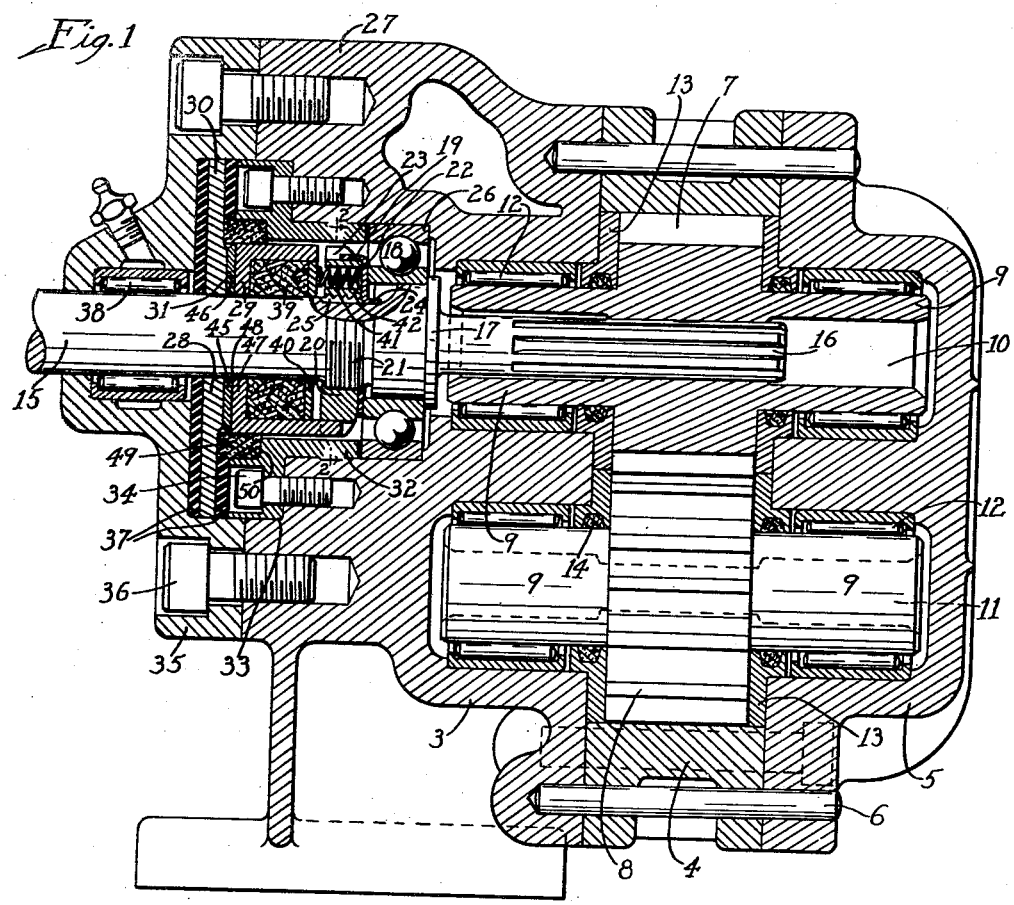
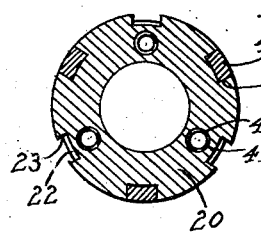
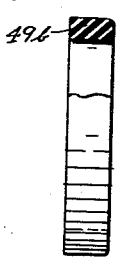
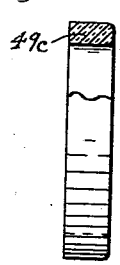
Inventor:
Swan E. Larson
By McCanna, Wintercorn & Morsbach
Attys.

Patented Dec. 25, 1945

2,391,577

UNITED STATES PATENT OFFICE 2,391,577

ROTARY PUMP SHAFT SEAL

Swan E. Larson, Rockford, Ill., assignor to Geo. D. Roper Corporation, Rockford, Ill., a corporation of Illinois Application March 19, 1943, Serial No. 479,737

17 Claims. (Cl. 308—187.1)

This application is a continuation in part of my copending application Serial No. 329,741, filed April 15, 1940.

This invention relates to improvements in seals for rotating shafts and, while herein disclosed as embodied in a seal for the drive shaft of a rotary gear pump designed for the pumping of liquids under high pressure, is applicable to a wide range of high pressure devices.

The principal object of my invention is to provide a high pressure seal in which the rotary seal ring adapted to rotate with the shaft relative to a cooperating stationary seal ring and to have rings of packing material enclosed therein and compressed into tight sealing contact with the shaft does not rely for its drive upon the spring means provided for urging the seal rings into contact, but has positive drive means in connection therewith for insuring continuous rotation of the rotary seal ring with the shaft, thereby avoiding any possibility of rotation of the shaft relative to the rings of compressed packing material and accordingly insuring highly efficient sealing action at all times and for long periods.

Still another object consists in the provision of a high pressure seal in which provision is made for filtering whatever fluid is permitted to find its way between the contacting surfaces of the relatively rotatable seal rings, whereby to exclude foreign matter and avoid likelihood of the contacting faces of the rings being scored. The filter ring may be made of felt, but I believe a more satisfactory and serviceable filter ring is one made of porous metal, like Durex, such porous metallic filters being obtainable in both iron and bronze alloys. The filter ring might also be made of a porous plastic or porous ceramic material. The solid filter rings have the advantage over felt that there is no danger of any loose fibers projecting and finding their way between the contacting surfaces of the seal rings and thus interfering with the aforesaid sealing action.

Still another important object is the provision in a high pressure seal of a resilient mounting for the stationary seal ring so as to give assurance of perfect seating of the stationary ring on the rotary ring.

Another important object is the provision of a seal of the kind mentioned in which a hardened steel stationary seal ring, as, for example, nitrited steel, is used in combination with a rotary seal ring, at least the sealing face portion of which is of a copper alloy, as, for example, one of high lead bronze, such a combination having been found by actual test to give longer life and generally improved performance over many other combinations tested. I prefer to have a bronze facing bonded by silver brazing onto a rotary seal ring body made of a base metal like iron or steel whereby to effect a considerable saving in cost while still having the advantages in so far as a good sealing combination is concerned, without any of the disadvantages which went with the use of bronze where the whole rotary seal ring was made of that material, the disadvantages being, first, that bronze has such a high coefficient of expansion and too much allowance had to be made for expansion, particularly under adverse operating conditions, and, secondly, bronze is relatively soft and does not, therefore, make a satisfactory medium from which to provide drive lugs for the positive driving of the rotary seal ring with the shaft, as contemplated by the present invention.

The invention is illustrated, as previously indicated, as applied to the drive shaft of a rotary gear pump—

Figure 1 being a central longitudinal section through a pump equipped with a high pressure seal made in accordance with my invention, and Fig. 2 being a sectional detail on the line 2—2 of Fig. 1 on an enlarged scale;

Figs. 3, 4, and 5 are sectional views of three different filter rings usable in the high pressure seal of Fig. 1 in place of the filter ring therein shown.

Similar reference numerals are applied to corresponding parts throughout the views.

The pump shown is similar to that disclosed in the copending application of Winthrop F. Collier, Serial No. 329,756, filed April 15, 1940, which resulted in Patent No. 2,316,565, issued April 13, 1943. 3 is the face plate, 4 the intermediate housing and 5 the back plate, these parts being secured together by bolts entered through the companion flanges. None of the bolts appears in Fig. 1, but only dowel pins 6 entered with a drive fit through registering holes to assume the hydraulic load on the gears 7 and 8, as described in the Collier application. The gears 7 and 8 have opposed trunnions 9 and there are axial bores 10 and 11 in the two gears opening communication between the opposite ends of the trunnions so as to maintain the gears in hydraulic balance. The trunnions operate in bearings 12 provided therefor in the face and back plates 3 and 5. Bronze bushings 13 provide end thrust bearing surfaces for the gears 7 and 8 and have felt filter rings 14 therein surrounding the trunnions 9 to catch foreign matter in the initial filling of the pump with oil or other fluid so as to avoid contamination of the bearings 12. In accordance with the disclosure in the Collier patent, the gear 7 is driven by the drive shaft 15 by the spline connection indicated at 16, the axial bore 10 in the gear 7 being internally splined to receive the splined end 16 of the shaft. As described in the Collier patent, this slip connection relieves the pumping gears of end thrust due to hydraulic pressure on the shaft 15 from within the pump, or due to any end thrust on the shaft arising outside the pump, due for example to drive connections. The hydraulic thrust outwardly on the shaft 15 is absorbed by the engagement of the flange 17 with the antifriction thrust bearing 18, and any thrust in the opposite direction is assumed by the bearing 18 through engagement therewith of the thrust washer 19 against which a thrust ring 20 threaded on the shaft 15 at 21 engages, the ring 20 being fixed in adjusted relation to the shaft 15 for the engagement of lugs 22 on the thrust washer 19 in peripheral notches 23 in the thrust ring 20. The thrust washer 19 is held against turning with respect to the shaft 15 by engagement of a lug 24 on its inner periphery in a keyway 25 provided in the threaded portion 21 of the shaft 15.

The high pressure seal of my invention is housed with the bearing 18 in the bore 26 of the hollow extension 27 of the face plate 3. 28 is the stationary seal ring and 29 the rotary seal ring. The ring 28 is in the form of a hardened steel plate, nitrated steel being preferred. This plate is cut away on the inner face to provide a radial outer portion 30 of decreased thickness and a radially inner portion of increased thickness, the inner face 31 of which cooperates with the rotary seal ring 29 and is normal to the axis of the shaft 15. A bushing 32 entered in a counterbore 33 in the outer end of the extension 27 serves to retain the bearing 18 in the bore 26 of said extension, screws 34 being provided to fasten the bushing in place. A cap 35 uses the bushing 32 as a pilot for location of the cap accurately in concentric relation with the extension 27 and is arranged to be suitably secured by screws 36 to the outer end of the extension 27, two washers 37 of asbestos bonded with synthetic rubber being provided on opposite sides of the seal ring 28 and subjected to compression when the cap 35 is fastened in place. These resilient washers avoid distortion of the stationary seal ring 28 in the assembling of the structure and give assurance of perfect seating of the ring 28 on the rotary seal ring 29 for a good sealing action. An elongated needle or roller bearing is provided in the cap 35 and is accurately aligned by the cap with the elongated bearing 18 so as to support the shaft 15 in perfect alignment with the seal ring 28 and thereby avoid any likelihood of the rotary seal ring 29 having any eccentric movement with respect to the stationary seal ring 28. It has been found to be extremely important in mechanical seals of this kind to avoid any possibility for eccentric movement of the rotary seal ring with respect to the stationary seal ring.

The rotary seal ring 29 is cup-shaped and encloses a series of compressible chevron section packing rings 39 which fit tightly around the shaft 15 and inside the ring 29 to prevent leakage along the shaft. A washer 40 engages the packing rings 39 and is urged toward the rings by a plurality of coiled compression springs 41 which extend through holes 42 in the thrust ring 20 parallel to the axis of the shaft 15, the springs being all backed up by the thrust washer 19, whereby the springs serve to keep the packing rings 39 compressed and at the same time keep the rotary seal ring 29 in sealing engagement with the ring 28. As indicated in Fig. 2, there are three holes 42 in equally circumferentially spaced relation in the ring 20 and three springs 41, one in each of these holes, all of the springs being, of course, of the same compression so as to place the packing rings 39 under uniform compression circumferentially thereof and keep the rotary seal ring 29 under uniform pressure toward the ring 28. Longitudinal slots 43 in the periphery of the ring 20 at three points in equally circumferentially spaced relation slidably receive lugs 44 projecting rearwardly from the rim of the cup-shaped sealing ring 29 so as to provide a positive driving connection between the rotary seal ring 29 and the shaft 15 and accordingly eliminate any possibility for the shaft 15 turning with respect to the packing rings 39. In all other seals with which I am familiar, it has been the practice to rely upon the friction between the shaft and the compressed packing to transmit drive to the rotary seal ring, and with that arrangement there is invariably a tendency for relative rotation between the shaft and the rotary seal ring and packing material therein with the result that the effectiveness of the seal between the sealing rings is reduced and leakage occurs along the shaft past the packing rings. The present construction absolutely eliminates the difficulty mentioned.

The stationary seal ring 28, as previously indicated, is of hardened steel—such as nitrited steel—whereas the rotary seal ring 29 has at least the sealing face portion 45 thereof of a copper alloy, such as high lead bronze, this combination having been found by extensive tests to give the desired long life and good sealing effect. The smooth flat surface 46 on the bronze face 45 cooperates with the smooth flat surface 31 on the stationary seal ring 28, but in accordance with my invention the body portion 47 of the rotary seal ring 29 is of a base metal like iron or steel, for several reasons:

(1) By bonding a thin washer 45 of bronze to the body portion 47 of iron or steel, an appreciable saving in cost is realized, and bronze at the present time is not available in as large quantities as it was in the past;
(2) Bronze has a high coefficient of expansion in relation to iron or steel and by bonding a thin washer of bronze to the iron or steel body the amount of expansion for which special allowance must otherwise be made under certain operating conditions is reduced to such a point that it can be substantially ignored, and
(3) By bonding the bronze face portion onto an iron or steel body, there is avoided any problem in regard to the provision of satisfactory drive lugs 44, these being of iron or steel with the present construction, which, of course, is much harder and more durable and has better shock resistance than bronze.

There has been no problem in the bonding of the thin washer of bronze to the iron or steel body, a typical bonding method practical for this purpose being the use of silver bronze. The brazing is indicated by the line 48.

It is important to avoid any likelihood of grit or other foreign matter finding its way in between the smooth flat interengaging surfaces 31 and 46 of the sealing rings. Otherwise the seal is opened and, depending upon the nature of the grit or other foreign matter, the surfaces may be scored. For that reason, I have provided a porous metal ring 49 in the annular recess 50 provided in the bushing 32 having a close working fit on the periphery of the rotary sealing ring 29. A porous metal suitable for the ring 49 is Durex, which is produced by briquetting iron powders and graphite under great pressure and then sintering or heating in special furnaces so as to obtain a porous structure in which there is residual graphite uniformly distributed through the pores to afford self-lubricating properties. Porous metallic filter rings of this kind are obtainable in both iron and bronze alloys. The filter ring 49 filters out the foreign matter from the oil or other fluid being pumped, and in that way insures continued satisfactory sealing function and protects the smooth flat surfaces of the rings relied upon for the sealing function.

In the parent application, I disclosed a filter ring 49a (Fig. 3) of felt filling the annular groove 50, and although felt gives satisfactory results under certain operating conditions, there is, nevertheless, the danger of its accumulating a smudge on the inner periphery so that eventually grit and foreign matter finds its way in between the rings. The porous metal ring 49 being relatively unyielding does not have that objection and will continue to afford a good filtering action so long as there is a close working fit between the inner periphery of the filter ring 49 and the outer periphery of the sealing ring 29. The self-lubricating property of Durex is important in that it minimizes wear.

In Fig. 4, I have shown still another filter ring 49b of plastic material adapted to be inserted in the annular groove 50 in place of the filter ring 49. Any one of various porous plastic materials may be used.

In Fig. 5, I have shown still another filter ring 49c of porous ceramic material adapted to be used in the annular groove 50 in place of the filter ring 49.

While I have illustrated my improved high pressure seal as applied to a rotary gear pump, it should be understood that the invention is not limited to that specific application. The gear pump shown is adapted for use with hydraulic machine tools, presses, road machinery, elevators and lifts, or on any other devices where oil or other fluid under high pressure is required—pressures of a thousand pounds per square inch or higher—the seal of my invention being thoroughly practical and serviceable at these pressures.

It is believed the foregoing description conveys a good understanding of the objects and advantages of my invention. The appended claims have been drawn with a view to covering all legitimate modifications and adaptations.

I claim:

1. In a device of the character described, a seal assembly for a rotary shaft having an outer casing, and a thrust bearing for said shaft to limit endwise movement thereof, said seal assembly including, in combination with means providing a seal ring engaging surface in the casing in spaced relation to said thrust bearing, a hollow seal ring adapted to turn with the shaft in engagement with the aforesaid surface to form a running seal therebetween, compressible packing material closely surrounding said shaft within said seal ring, a washer surrounding the shaft behind said packing material for compressing the same, another washer surrounding the shaft and engaging the thrust bearing in spaced relation to the last named washer, a thrust ring threaded on the shaft between said washers having means for locking the same against turning relative to the shaft from adjusted position, said thrust ring having longitudinal holes provided therein in circumferentially spaced relation, coiled compression springs housed in said holes and having engagement at their opposite ends with the washers, whereby to compress the packing material and urge the hollow seal ring into engagement with the aforesaid surface, and means providing a positive sliding driving connection between the thrust ring and hollow seal ring.

2. In a device of the character described, a seal assembly for a rotary shaft having an outer casing and a thrust bearing for said shaft in said casing to limit endwise movement thereof, said seal assembly including, in combination with a seal ring turning with the shaft in said casing and spring pressed to move outwardly relative to the thrust bearing, a stationary bearing retainer ring in said casing in annularly spaced relation to the seal ring, a stationary seal ring surrounding the shaft in spaced relation to the bearing retainer ring and having a flat annular surface on the inner side thereof for engagement with the aforesaid seal ring turning with the shaft to form a running seal therebetween, an outer bearing ring adapted to be secured to the casing and having pilot engagement with the bearing retainer ring and providing outer bearing support for the shaft when secured to the casing, and compressible resilient packing material on opposite sides of the marginal portion of the stationary seal ring arranged to be compressed between the bearing retainer ring and the outer bearing ring when the latter is secured to the casing, whereby to prevent leakage from the casing around the periphery of the stationary seal ring without fixing the position of said stationary seal ring in rigid relation to the casing.

3. A structure as set forth in claim 2, including filtering means in said casing enclosing the joint between the seal rings to prevent entry of foreign matter between the contacting surfaces of the running seal.

4. In a device of the character described, a seal assembly for a rotary shaft having an annular flange thereon, an outer casing, and coaxially spaced bearings for said shaft in said casing, said annular flange on said shaft being arranged to engage the inner side of the inner one of said bearings to limit outward movement of the shaft, said seal assembly including a stationary seal ring in said casing between said bearings, a rotary seal ring turning with the shaft and spring-pressed toward engagement with the stationary ring, and filtering means between the inner one of the shaft bearings and the seal rings to prevent entry of foreign matter between the contacting surfaces of the seal rings while permitting entry of filtered liquid therebetween.

5. In a device of the character described, a seal assembly for a rotary shaft having an annular flange thereon, an outer casing, coaxially spaced bearings for said shaft in said casing, said annular flange on said shaft being arranged to engage the inner side of the inner one of said bearings to limit outward movement of the shaft, and a thrust ring on said shaft, said seal assembly including a stationary seal ring in said casing between said bearings, a hollow rotary seal ring turning with the shaft and arranged to have running sealing engagement with the stationary ring, means providing a driving connection between the thrust ring and the seal ring, compressible packing means closely surrounding said shaft within the seal ring, and spring means subjecting said packing material to compression while pressing the seal ring toward engagement with the stationary ring.

6. In a device of the character described, a seal assembly for a rotary shaft having an annular flange thereon, an outer casing, a thrust bearing for said shaft in said casing to limit endwise movement thereof by engagement at its inner end with said flange, and a thrust ring mounted on and turning with the shaft adjacent the outer end of said bearing to limit endwise movement of said shaft inwardly, said seal including a stationary seal ring surrounding the shaft in the casing in outwardly spaced relation to said thrust ring, resilient means mounting said ring in said casing whereby said ring is self-aligning with respect to the shaft while held against turning relative to said casing, said resilient means also sealing the casing against leakage past said stationary seal ring, a hollow seal ring turning with the shaft and arranged for engagement with said stationary ring to form a running seal therebetween, compressible packing material closely surrounding said shaft within said seal ring, spring means to compress the packing material and urge the seal ring into close contact with the stationary ring, and means providing a positive driving connection between the thrust ring and seal ring.

7. In a device of the character described, a seal assembly for a rotary shaft having an outer casing, said shaft extending from said casing and being subject to endwise axial movement, and means for limiting endwise movement of said shaft including a bearing fixed in relation to said casing, a thrust flange element on said shaft for engagement with one side of the bearing, and a thrust ring element adjustably fixed on and turning with said shaft for adjustment toward the other side of said bearing, said seal assembly including a cap through which the shaft extends fixed on the end of said casing in spaced relation to the outer one of said thrust elements, means on said cap providing a flat sealing surface in a plane substantially normal relative to the shaft and extending annularly with respect thereto, a hollow seal member mounted on said shaft within said casing and at one end having a sliding driving connection with the outer one of said thrust elements and cooperating at its other end with said flat sealing surface to form a running seal therebetween, compressible packing means in said hollow seal member in close contact with said shaft, and spring means to compress the packing means and urge the seal member toward operative engagement with said wall.

8. A structure as set forth in claim 7, wherein the thrust ring constitutes the outer one of said thrust elements, the structure including washers on opposite sides of said thrust ring, the one washer engaging the bearing and the other washer engaging the compressible packing means, and wherein the thrust ring has one or more longitudinal through holes provided therein substantially parallel to said shaft, and said spring means comprises coiled compression springs disposed in said holes acting against the washers at their opposite ends to compress the compressible packing means.

9. A structure as set forth in claim 5, including filtering means in said casing enclosing the joint between the seal rings to prevent entry of foreign matter between the contacting surfaces of said rings.

10. A structure as set forth in claim 7, including filtering means in said casing enclosing the joint between the hollow seal member and the sealing surface engaged thereby to prevent entry of foreign matter between said seal member and surface and permit only filtered liquid to enter therebetween.

11. In a device of the character described, a seal assembly for a rotary shaft having an outer casing, said seal assembly including, in combination with the shaft, means providing a seal ring engaging surface in the casing, a rotary seal ring turning with the shaft and pressed toward engagement with the aforesaid surface, and a porous metallic filter ring fixed in said casing enclosing the joint between the seal ring and surface engaged thereby and having a close working fit on the periphery of the seal ring to prevent entry of foreign matter between said ring and surface and permit only filtered liquid to enter therebetween.

12. In a device of the character described, a seal assembly for a rotary shaft having an outer casing, said seal assembly including, in combination with the shaft, means providing a seal ring engaging surface in the casing, a rotary seal ring turning with the shaft and pressed toward engagement with the aforesaid surface, and a filter ring of porous material fixed in said casing enclosing the joint between the seal ring and surface engaged thereby and having a close working fit on the periphery of the seal ring to prevent entry of foreign matter between said ring and surface and permit only filtered liquid to enter therebetween.

13. In a device of the character described, a seal assembly for a rotary shaft having an outer casing, said shaft extending through a wall of said casing, and means for positively limiting endwise movement of said shaft, said seal assembly including a removable and replaceable hardened steel ring stationarily mounted in the casing and having a smooth flat annular surface on the one side thereof, a rotary seal ring turning with the shaft and having at least the sealing face portion thereof of copper alloy providing a flat smooth annular surface slidably engaging the aforesaid surface on the hardened steel ring, spring means holding the rotary seal ring in contact with the first stationary ring, and filtering material in said casing enclosing the joint between the seal rings for preventing entry of foreign matter between the contacting surafces of said rings and permitting only filtered liquid to enter therebetween.

14. A high pressure seal between a shaft and a casing structure in which the shaft is mounted for rotation, comprising a removable and replaceable hardened steel ring stationarily mounted in the casing structure and having a smooth flat annular surface on the one side thereof normal to the shaft, a rotary seal ring of copper alloy turning with the shaft and having a flat smooth annular surface at one end thereof adapted for sealing contact against the aforesaid surface on the hardened steel ring in response to high pressure within the casing against said rotary seal ring, and filtering material in said casing enclosing the joint at the periphery of the contacting surfaces between the seal rings for preventing entry of foreign matter between said contacting surfaces and permitting only filtered liquid to enter therebetween.

15. A high pressure seal between a shaft and a casing structure in which the shaft is mounted for rotation, comprising means providing a stationarily located seal ring engaging surface in the casing, a hollow rotary seal ring turning with the shaft and arranged to engage the aforesaid surface to form a running seal, compressible packing means closely surrounding the shaft within the sail ring, means urging the seal ring into engagement with the aforesaid surface, and a ring of filtering material in said casing enclosing the joint at the periphery between the seal ring and surface engaged thereby to prevent entry of foreign matter between said ring and surface and permit only filtered liquid to enter therebetween.

16. A high pressure seal between a shaft and a casing structure in which the shaft is mounted for rotation comprising a seal ring in the form of a hardened steel disk-like plate around the shaft in a plane normal thereto, resilient washers on opposite sides of said seal ring, means clamping said washers against the interposed ring and to the casing structure to maintain the ring under resilient compression in a stationary position with respect to the casing structure without fixing the position of the ring in rigid relation to said casing structure, a hollow rotary seal ring movable axially on the shaft in response to pressure within the casing structure and having at one end a seal surface adapted for sealing contact against the stationary seal ring when so moved, compressible packing material within the hollow seal ring closely surrounding and sealing said shaft, means providing a positive sliding driving connection between the shaft and the hollow seal ring, and filtering means at the periphery of the hollow seal ring arranged to prevent entry of foreign matter between the sealing surfaces of the seal rings while permitting entry of filtered liquid therebetween.

17. A high pressure seal between a shaft and a casing structure in which the shaft is mounted for rotation, comprising a disk-like seal ring around the shaft in a plane normal thereto, compressible resilient packing material on opposite sides of the marginal portion of said seal ring, means for compressing said packing material against the interposed seal ring in fixed relation to the casing structure to stationarily support said seal ring without fixing the position of the ring in rigid relation to said casing structure, said packing material serving to prevent leakage from the casing structure around the periphery of said seal ring, a combined seal and packing ring movable axially on the shaft having an end surface adapted for sealing contact with the stationary seal ring and having packing material closely surrounding and sealing the shaft means providing a positive sliding driving connection between the shaft and the rotary seal ring, means for urging the rotary seal ring endwise into said sealing contact, and filtering means coacting between the stationary and rotary seal rings to prevent entry of foreign matter between said contacting surfaces of the seal rings from the peripheral edge thereof while permitting entry of filtered liquid therebetween.

SWAN E. LARSON.